(12) United States Patent
Blanco et al.

(10) Patent No.: US 10,411,963 B2
(45) Date of Patent: Sep. 10, 2019

(54) APPARATUS AND METHOD FOR DISTRIBUTING RULE OWNERSHIP AMONG DEVICES IN A SYSTEM

(71) Applicant: MOTOROLA SOLUTIONS, INC, Schaumburg, IL (US)

(72) Inventors: Alejandro G. Blanco, Fort Lauderdale, FL (US); Fabio M. Costa, Weston, FL (US); Melanie A. King, Hollywood, FL (US); Shervin Sabripour, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 88 days.

(21) Appl. No.: 14/924,897

(22) Filed: Oct. 28, 2015

(65) Prior Publication Data

US 2016/0050118 A1    Feb. 18, 2016

Related U.S. Application Data

(63) Continuation-in-part of application No. 14/263,457, filed on Apr. 28, 2014.

(51) Int. Cl.
*H04L 12/24* (2006.01)
*H04W 4/08* (2009.01)
(Continued)

(52) U.S. Cl.
CPC .......... *H04L 41/0893* (2013.01); *H04L 47/70* (2013.01); *H04W 4/021* (2013.01);
(Continued)

(58) Field of Classification Search
USPC ....................................................... 709/224
See application file for complete search history.

(56) References Cited

U.S. PATENT DOCUMENTS 4,491,946 A   1/1985   Kryskow, Jr. et al.
6,993,587 B1 * 1/2006   Basani ................. H04L 69/329
                                                           709/229
(Continued)

FOREIGN PATENT DOCUMENTS

EP    1 176 762 A1    1/2002
WO    2006047205      4/2007
WO    2009/064751 A2  5/2009

OTHER PUBLICATIONS

U.S. Office Action, U.S. Appl. No. 14/263,457, filed Apr. 28, 2014, dated Jan. 20, 2016.

(Continued)

*Primary Examiner* — Umar Cheema
*Assistant Examiner* — John Fan
(74) *Attorney, Agent, or Firm* — Daniel R. Bestor

(57) ABSTRACT

A first device in a group of devices is assigned a role of operating as an elected leader node for the group of devices. The elected leader node determines that a sensor entity of a sensor entity type is associated with one device in the group of communication devices. The elected leader node creates a token and associates the token with the sensor entity. The elected leader node also assigns ownership for the token to one device based on the device being associated with the sensor entity and further based on one or more of: at least one incident allocation criterion; at least one sensor entity allocation criterion; and at least one node allocation criterion. One device executes at least one predefined sensor entity rule associated with the sensor resource type based on ownership of the token assigned to the sensor entity.

14 Claims, 6 Drawing Sheets

(51) Int. Cl.
*H04W 4/70* (2018.01)
*H04W 4/021* (2018.01)
*H04L 12/911* (2013.01)
*H04W 4/90* (2018.01)
*H04L 12/26* (2006.01)
*H04W 84/20* (2009.01)

(52) U.S. Cl.
CPC ............... *H04W 4/08* (2013.01); *H04W 4/70* (2018.02); *H04L 43/04* (2013.01); *H04W 4/90* (2018.02); *H04W 84/20* (2013.01)

(56) References Cited

U.S. PATENT DOCUMENTS

| | | | |
|---|---|---|---|
| 7,421,578 B1* | 9/2008 | Huang | H04L 63/065 370/254 |
| 7,493,371 B1* | 2/2009 | Bali | H04L 67/14 709/203 |
| 8,254,256 B2 | 8/2012 | Padwekar | |
| 8,526,929 B1 | 9/2013 | Gilbert et al. | |
| 8,903,657 B2 | 12/2014 | Bekiares et al. | |
| 2004/0153451 A1 | 8/2004 | Phillips | |
| 2005/0223114 A1 | 10/2005 | Hanson et al. | |
| 2007/0202907 A1 | 8/2007 | Shaffer et al. | |
| 2007/0214046 A1 | 9/2007 | Falchuk et al. | |
| 2011/0081632 A1* | 4/2011 | Garg | G09B 5/00 434/118 |
| 2013/0024267 A1 | 1/2013 | Libenson et al. | |
| 2013/0324081 A1 | 12/2013 | Gargi | |
| 2014/0047019 A1* | 2/2014 | Midtun | H04L 51/043 709/204 |
| 2014/0053223 A1 | 2/2014 | Vorobyov et al. | |
| 2014/0053234 A1 | 2/2014 | Barton | |
| 2014/0087695 A1* | 3/2014 | Hjelm | H04W 4/006 455/411 |
| 2014/0244765 A1* | 8/2014 | Smith | H04L 51/24 709/206 |
| 2016/0050118 A1 | 2/2016 | Blanco et al. | |

OTHER PUBLICATIONS

International Search Report and Written Opinion for corresponding International Patent Application No. PCT/US2015/026161, dated Sep. 8, 2015.

Murat Kantarcioglu et al., "Privacy—Preserving distributed mining of association rules on horizontally partitioned data," IEEE Transaction on Knowledge and Data Engineering, vol. 16, No. 9, Sep. 2004, pp. 1026-1037.

Florian Rosenberg et al., "Applying distributed Business Rules—The VIDRE Approach," IEEE International Conference on Services Computing (SCC'06), 2006.

* cited by examiner

APPARATUS AND METHOD FOR DISTRIBUTING RULE OWNERSHIP AMONG DEVICES IN A SYSTEM

The present invention is a continuation in part (CIP) application of U.S. patent application Ser. No. 14/263,457 filed in the United States Patent Office on Apr. 28, 2014, the entire contents of which are incorporated herein by reference.

BACKGROUND OF THE INVENTION

An organization, for example, a public safety organization, may have different types of resources for responding to incidents or other events. Non-limiting examples of the resources may include users of communication devices, mobile communication devices such as mobile or portable radios, servers and other back end computing devices, and vehicles with communications systems. When an incident occurs, each resource having information related to the incident may transmit the information to other resources. Each resource may also execute local rules based on the information it receives from other resources or the information it transmits to other resources. Subsequent to executing the local rules, the resource may determine that certain conditions exist and/or that certain actions must be performed.

For example, consider that a police department has several mobile radios in an area. If a first mobile radio receives information indicating that a user associated with the first mobile radio is outside of a vehicle, that the user is running and that a shot has been fired, the first mobile radio may append a timestamp to the information prior to transmitting the information to other resources. The first mobile radio may also execute predefined local rules using the information it transmitted to other the resources and may determine, responsive to executing the local rules, for example, that a high threat level exists. If the rules associated with the determined high threat level also indicate, for example, that an alert of this threat level must be transmitted to other resources, the first mobile radio may also append a timestamp to the alert and transmit the alert in accordance with the rules. The first mobile radio may also perform other actions that are associated with the determined condition. For example, the first mobile radio may request a high priority network connection when such an action is associated with the high threat level.

Each of the resources receiving the information and/or alert from the first mobile radio may also execute predefined local rules and may also determine based on the received information that the condition (i.e., the high threat level) exists. Similar to the first mobile radio, each of the other resources receiving the alert from the first mobile radio may append a timestamp to its alert and send out the alert to other resources, including the first mobile radio. In other words, each resource executing the same rule may determine that the same condition exists and perform the same actions. This may lead to a circular situation wherein the resources may redundantly share the same known information with different timestamps with each other, thereby wasting the network bandwidth. Furthermore, when each resource receives information that is already known to the resource, the resource may reprocess the information (i.e., the resource may process newly received information even when that information was previously known and/or processed by the resource).

Accordingly, there is a need for an apparatus and method for distributing rule ownership among resources in a system so that a predefined resource may execute a predefined rule.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
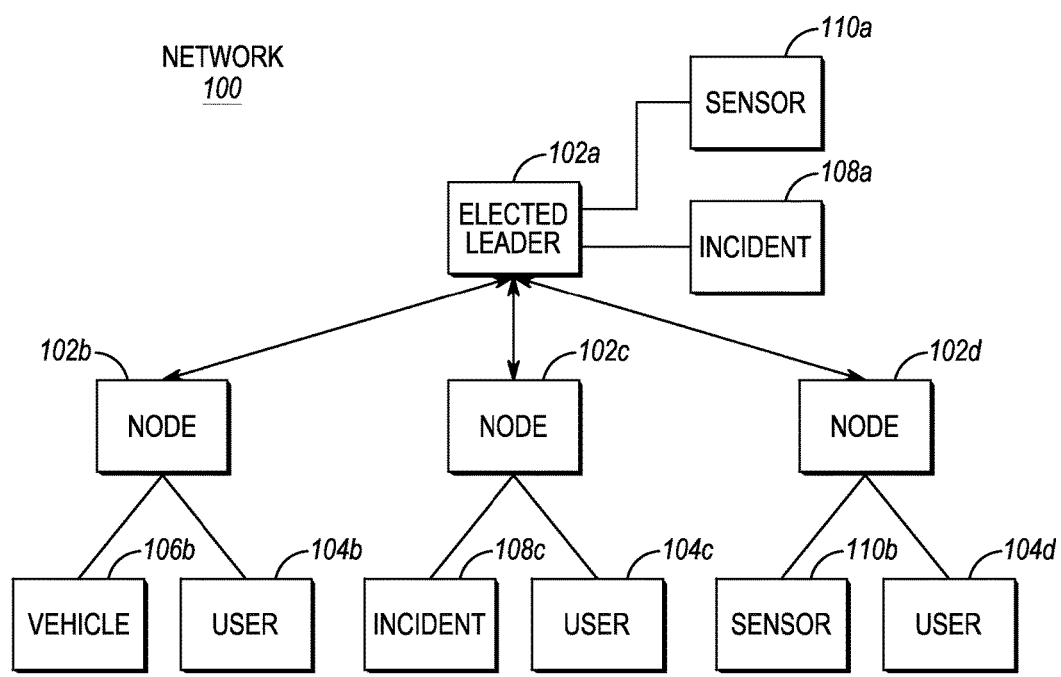
FIG. 1 is a block diagram of a network of nodes used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for method for distributed rule ownership. A first communication device in a group of communication devices is assigned a role of operating as an elected leader node for the group of communication devices. The elected leader node determines that an entity is associated with one of the first communication device and a second communication device in the group of communication devices. The elected leader node creates a token and associates the token with the entity. The elected leader node also identifies a resource type to which the entity belongs, assigns ownership for the token to one of the first communication device and the second communication device based on one of the first communication device and the second communication device being associated with the entity and further based on one or more of: at least one incident allocation criterion; at least one entity allocation criterion; and at least one node allocation criterion. One of the first communication device and the second communication device executes at least one predefined entity rule associated with the resource type based on ownership of the token assigned to the entity.

FIG. 1 is a block diagram of a network of nodes used in accordance with some embodiments. Network 100 may include a group of nodes 102 (i.e., nodes 102a-102d), each of which is also referred to herein as a communication device 102. Each node 102 may be, for example, a communication device such as mobile or portable communication device or a computing device such as a back-end elected leader or a laptop. Each node 102 may be communicatively coupled to at least one other node in network 100 and each node 102 may be configured to execute one or more sets of rules based on information transmitted and/or received by that node. The topology of network 100 may be dynamic, i.e., the network topology may change depending on how nodes 102 are connected to each other. Non-limiting examples of the network topologies that may be formed by nodes 102 may include an ad-hoc network topology, a meshed network topology, and a star network topology.

One node, for example, node 102a, may be assigned to role of an elected leader node. Node 102a may be preconfigured to operate as the elected leader node or node 102a may be dynamically selected by the other nodes 102 (i.e., one or more of nodes 102b-102d) to operate as the elected leader node. The elected leader node identifies groups of resources in network 100 and assigns a token to each resource in each group. Each resource group/type may include one or more of a physical entity or one or more of an event entity. A physical entity may be, for example, a user entity, a vehicle entity, or a sensor entity that is associated with a specific node 102. An event entity may be, for example, an incident that may or may not be associated with a specific node 102. Both the physical entity and the event entity are referred to herein as an entity. A sensor entity, in particular, may be a sensor device capable of detecting one or more biological or environmental conditions, and reporting levels or alerts associated with the one or more biological or environmental conditions. Examples sensor devices include, but are not limited to, a gunshot detector, an environment sensor such as a radiation or toxicity sensor, a smoke detector, a carbon dioxide or carbon monoxide detector, a fire detector, a heart rate monitor, an oxygen level detector, a motion detector, and an accelerometer.

When a node connects to network 100, the elected leader node may determine the entities that are currently associated with that node and may assign a token to each entity associated with that node. Accordingly, when node 102b connects to network 100, elected leader node 102a may determine that a user 104b and a vehicle 106b are associated with node 102b and may assign a token to each of user 104b and vehicle 106b. Similarly, when node 102c connects to network 100, elected leader node 102a may determine that a user 104c and an incident 108c are associated with node 102c and the elected leader node may assign a token to each of user 104c and incident 108c; and when node 102d connects to network 100, elected leader node 102a may determine that a user 104d and a sensor 110b are associated with node 102d and the elected leader node may assign a token to each of user 104d and sensor 110b.

In some embodiments, elected leader node 102a may determine that a new entity has been added to network 100 based on information received from a non-elected leader node associated with the new entity. Accordingly, subsequent to determining that a new entity has been added to network 100, elected leader node 102a may create a token for that entity, wherein elected leader node 102a may create a token for each physical entity or event entity added to network 100.

Consider, for example, that elected leader node 102a is associated with incident 108a and sensor 110a, node 102b is associated with user 104b and vehicle 106b, node 102c is associated with user 104c and incident 108c, and node 102d is associated user 104d and sensor 110b, as shown in FIG. 1. Subsequent to being assigned the role of an elected leader node, node 102a may create user tokens (for example, UT-1, UT-2 and UT-3) for each of the user entities in the user resource type and may assign a user token to each user entity (i.e., user 104b, 104c and 104d). Elected leader node 102a may also create incident tokens (for example, IT-1 and IT-2) for each of the incident entities in the incident resource type and may assign an incident token to each incident (i.e., incident 108a and 108c); and elected leader node 102a may create vehicle tokens (for example, VT-1 and VT-2) for each of the vehicle entities in the vehicle resource type and may assign a vehicle token to each vehicle entity (i.e., vehicle 106b). Finally, elected leader node 102a may create sensor tokens (for example, SN-1 and SN-2) for each of the sensor entities in the sensor resource type and may assign a sensor token to each sensor entity (i.e., sensor 110a and 110b).

Subsequent to assigning a token to each physical entity or event entity, elected leader node 102a may assign ownership for the token to the node associated with the physical entity or event entity assigned the token. Accordingly, in FIG. 1, elected leader node 102a may assign ownership for the token associated with incident 108a and sensor 110a to itself. Elected leader node 102a may also assign ownership for the tokens associated with user 104b and vehicle 106b to node 102b; elected leader node 102a may assign ownership for the tokens associated with user 104c and incident 108c to node 102c; and elected leader node 102a may assign ownership for the tokens associated with user node 104d and sensor 110b to node 102d. Each owner node (i.e., each node with ownership of a token) may execute at least one set of predefined entity rules that are associated with the resource type for the entity associated with the token. For example, each of nodes 102b, 102c and 102d may execute at least one set of predefined entity rules that are associated with a user resource type; each of nodes 102a and 102c may execute at least one set of predefined entity rules that are associated with an incident resource type; node 102b may execute at least one set of predefined entity rules that are associated with a vehicle resource type; and each of nodes 102a and 102d may execute at least one set of predefined entity rules that are associated with a sensor resource type.

If, for example, vehicle entity 106b becomes disconnected from node 102b, elected leader node 102a may mark the token associated with vehicle entity 106b for reallocation. At a subsequent time, if vehicle entity 106b becomes reconnected to network 100 via, for example, node 102c, elected leader node 102a may reassign the token to vehicle entity 106b and assign ownership for the reassign token to node 102c or elected leader node 102a may assign a new token to vehicle entity 106b and assign ownership for the new token to node 102c.

When elected leader node 102a loses contact with a non-elected leader node (for example, node 102b), elected leader node 102a may de-allocate tokens assigned to node 102b, remove the entity types associated with node 102b and re-allocate the tokens previously assigned to node 102b to another node, if necessary. If node 102b loses contact with elected leader node 102a, node 102b may wait for a predefined-time period (referred to herein as a hysteresis time) and may check to see if it can reconnect with elected leader node 102a within the hysteresis time. If node 102b cannot not reconnect with elected leader node 102a within the hysteresis time, node 102b may establish connections with a new elected leader node.

Nodes 102 may use the tokens assigned to each resource type to determine how to share data. For example, if specific information is needed to execute a rule associated with a user resource type, the tokens assigned to user entities may be used to manage data flow. Therefore, each of nodes 102b, 102c and 102d with ownership of the tokens assigned to user entities may receive the specific information needed to execute the rule(s) associated with the user resource type. In some embodiments, information that is required to execute a rule associated with a resource type may be tagged with (appended to) the tokens assigned to the resource type. Nodes 102 may use the tag(s) during, for example, transmission of information.

An event entity may have a geographical boundary (referred to herein as a geo-fence) and/or a time interval (referred to herein as a time-window). At the time elected leader node 102a determines that an event entity is present in network 100, the event entity and may or may not be associated with a specific node. For example, when an environmental event such as a toxic chemical detection occurs within a given location, subsequent to processing information associated with the environmental event, elected leader node 102a may determine that the event entity is not associated with a specific node. Elected leader node 102a may thereafter associate the event entity with a node based on a predefined criterion.

A new node may become the elected leader node when connectivity between nodes 102 changes. For example, if node 102a is no longer communicatively coupled to nodes 102a, 102c and/or 102d, a new node may become the elected leader node. Also, if a new node (not shown) is added to network 100, the new node may take over from node 102a and become the elected leader node. Each time a new node is assigned to operate as the elected leader node, each non-elected leader nodes may report its current token assignment to the new elected leader node, release its current token assignments and discontinue executing rules associated with the current token assignments. The new elected leader node may subsequently reassign tokens to the non-elected leader nodes and inform the non-elected leader nodes of the subsequently reassigned tokens.

Figure 2:
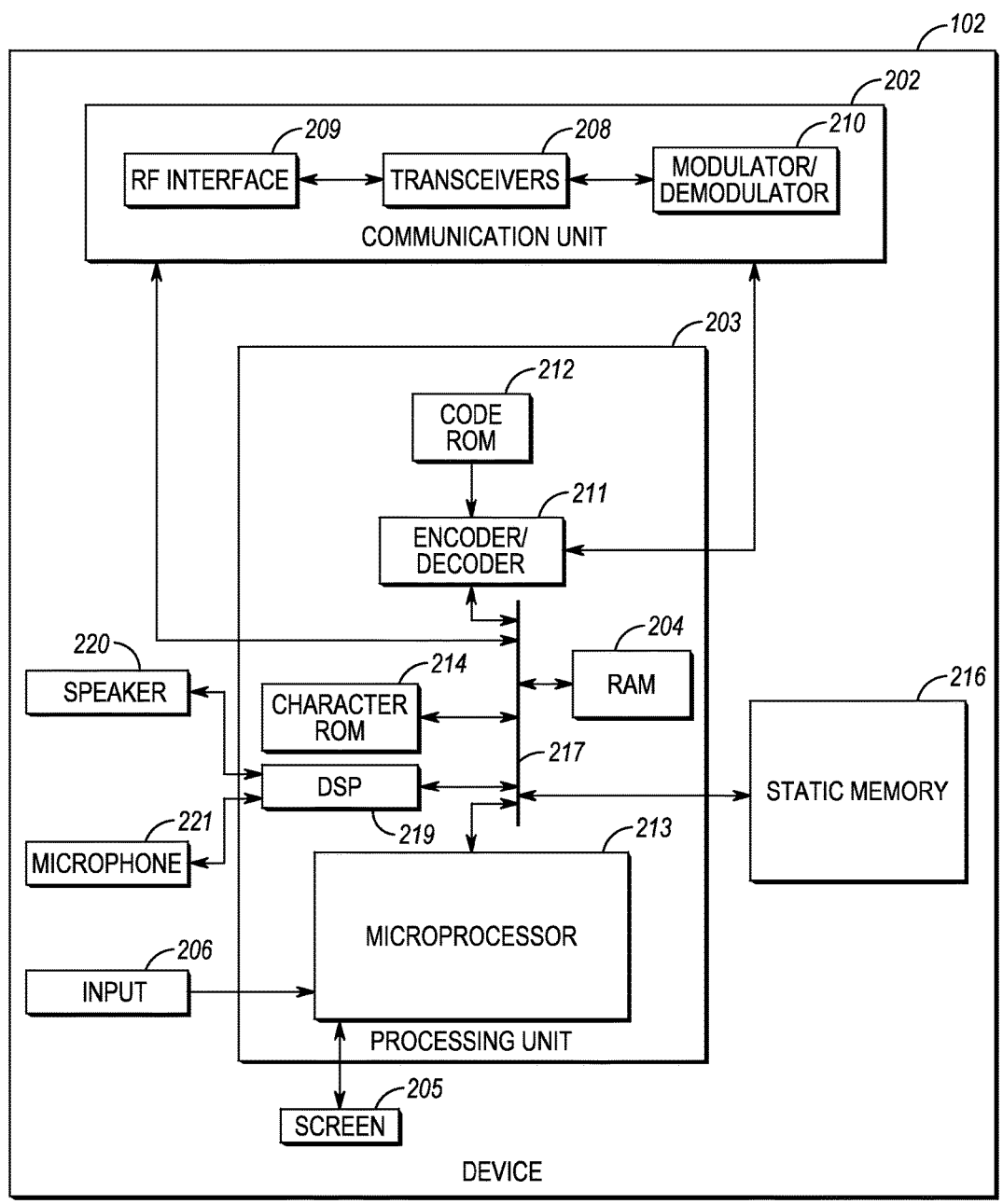
FIG. 2 is a block diagram of a communication device used in accordance with some embodiments.

FIG. 2 is a block diagram of a communication device used in accordance with some embodiments. Communication device 102 may be, for example, a radio that includes a communications unit 202 coupled to a common data and address bus 217 of a processing unit 203. Communication device 102 may also include an input unit (e.g., keypad, pointing device, etc.) 206, an output transducer unit (e.g., speaker) 220, an input transducer unit (e.g., a microphone) (MIC) 221, and a display screen 205, each coupled to be in communication with the processing unit 203.

Processing unit 203 may include an encoder/decoder 211 with an associated code read-only memory (ROM) 212 for storing data for encoding and decoding voice, data, control, or other signals that may be transmitted or received by communication device 102. Processing unit 203 may further include a microprocessor 213 coupled, by the common data and address bus 217, to the encoder/decoder 211, a character ROM 214, a random access memory (RAM) 204, and a static memory 216. One or more of ROM 214, RAM 204 and static memory 216 may include a non-volatile memory portion for storing the timestamp and counter values of communication device 200. The processing unit 203 may also include a digital signal processor (DSP) 219, coupled to the speaker 220, the microphone 221, and the common data and address bus 217, for operating on audio signals received from one or more of the communications unit 202, the static memory 216, and the microphone 221.

Communications unit 202 may include an RF interface 209 configurable to communicate with network components, and other user equipment within its communication range. Communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 202 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver. The transceivers may be coupled to a combined modulator/demodulator 210 that is coupled to the encoder/decoder 211.

The character ROM 214 stores code for decoding or encoding data such as control, request, or instruction messages, channel change messages, and/or data or voice messages that may be transmitted or received by communication device 200. Static memory 216 may store operating code for performing one or more of the steps set forth in FIGS. 3-6. Static memory 216 may also store sensor information aggregated from one or more sensor nodes 110a, 110b with which the communication device 102 is associated, or sensor information received from other communication devices 102, among other user, vehicle, and/or incident information associated with the communication device 102 or other communications devices. The stored sensor information may then be used to compare with threshold values and/or other entity rules, the threshold information and other rules providing context information of the communication device 102 and/or other communication devices, which may act as inputs into the communication device's 102 determination of how and how much sensor information, incident information, user information, and/or vehicle information to share with other communications devices, or to determine conditions that exist around the communications device or actions that must be performed by the communications device or a user of the communications device 102 or other communications devices, with other communication devices.

Figure 3:
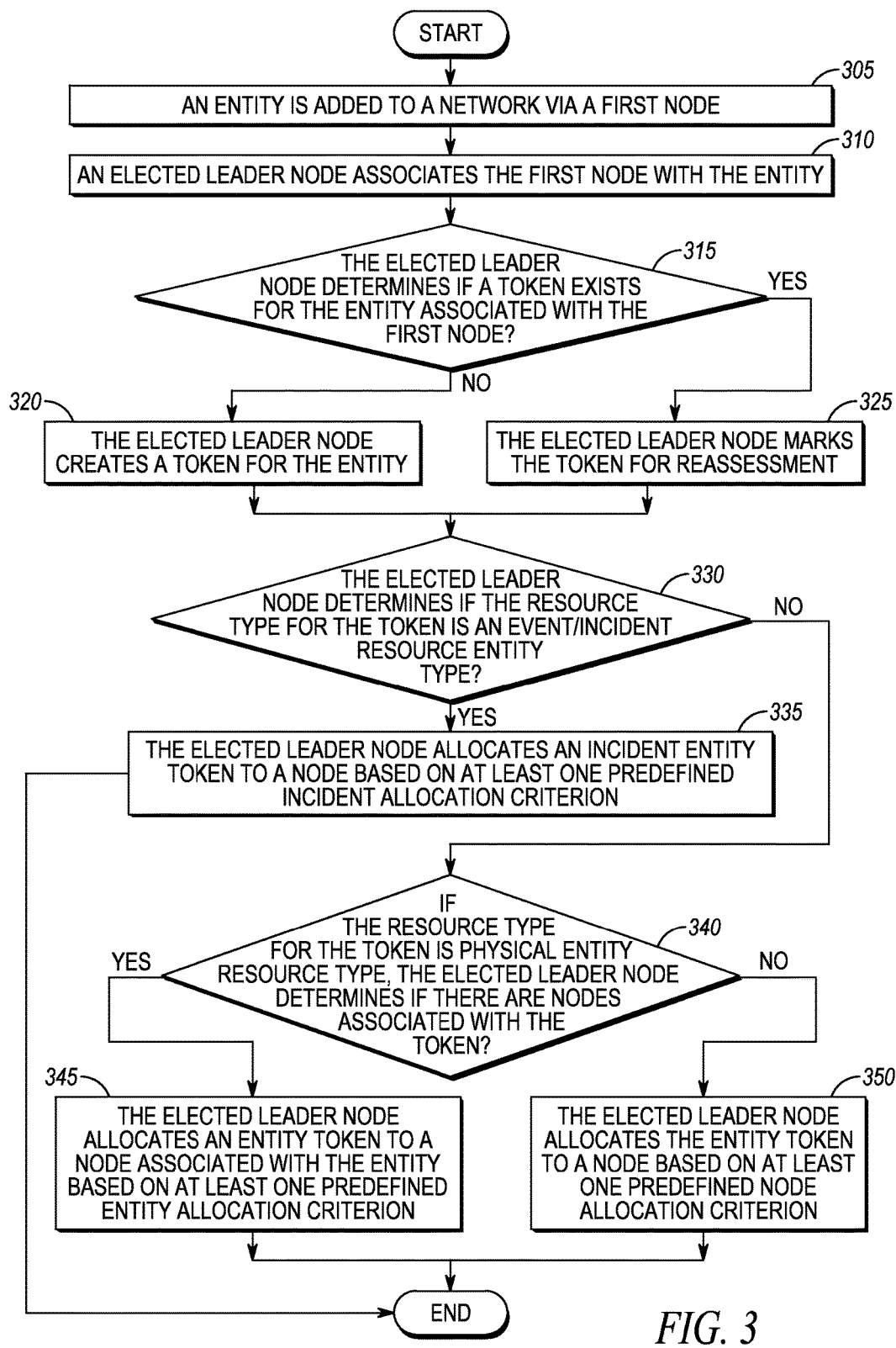
FIG. 3 illustrates a flow diagram of a method for assigning a token to an entity in accordance with some embodiments.

FIG. 3 illustrates a flow diagram of a method for assigning a token to an entity in accordance with some embodiments. At 305, an entity is added to a network via a first node. The entity may be, for example, a physical entity such as a user that connects to the network using the first node or a sensor entity that is associated with the first node. At 310, an elected leader node associates the first node with the entity. At 315, the elected leader node determines if a token exists for the entity associated with the first node. At 320, if no token exists, the elected leader creates a token for the entity. At 325, if a token exists, the elected leader node marks the token for reassessment. At 330, for each newly created token or each token marked for assessment, the elected leader node determines if the resource type for the token is an event/incident resource entity type. At 335, if the resource type for the token is an event/incident resource entity type, the elected leader node allocates an incident entity token to a node based on at least one predefined incident allocation criterion. Non-limiting examples of the predefined incident allocation criterion may include assigning the incident entity token to an available elected leader, assigning the incident entity token to a node nearest to an incident location, assigning the incident entity token to a node associated with or near an incident commander, assigning the incident entity token to a node with the lowest number of assigned tokens, and assigning the incident entity token to a node that is not battery powered.

At 340, if the resource type for the token is physical entity resource type, the elected leader node determines if there are nodes associated with the token. At 345, the elected leader node allocates an entity token to a node associated with the entity based on at least one predefined entity allocation criterion. At 350, the elected leader node allocates the entity token to a node based on at least one predefined node allocation criterion. Non-limiting examples of the predefined node allocation criterion may include assigning the entity token to a node with the lowest number of assigned tokens, assigning the entity token associated with an incident to a node associated with the incident, and assigning the entity token to a node that is not battery powered.

Figure 4:
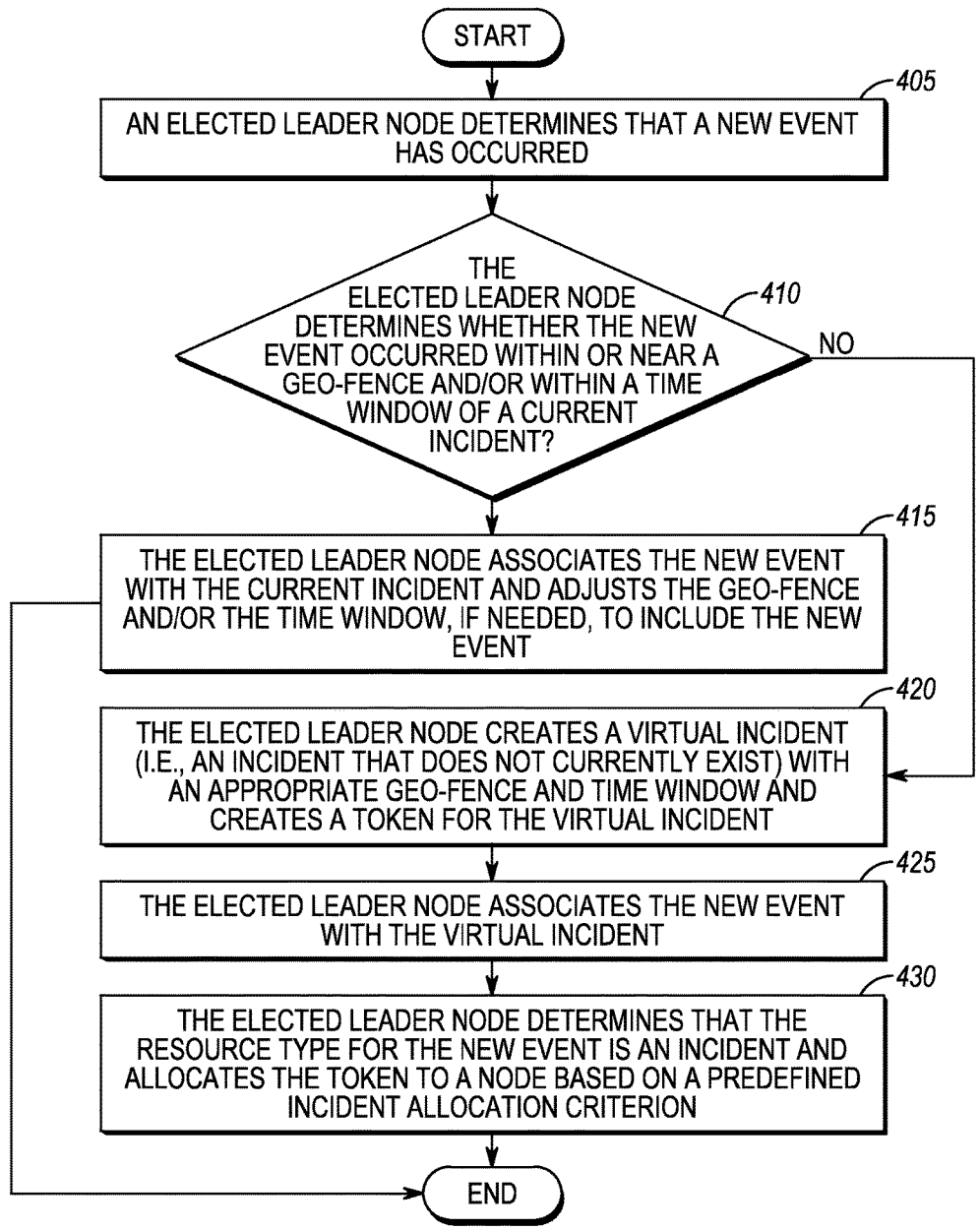
FIG. 4 illustrates a flow diagram of a method for assigning an incident entity token to an event in accordance with some embodiments.

FIG. 4 illustrates a flow diagram of a method for assigning an incident entity token to an event in accordance with some embodiments. At 405, an elected leader node determines that a new event has occurred. The event may be, for example, an environmental event. The incident may be determined by the elected leader node or the incident may be determined by another node and reported to the elected leader node. At 410, the elected leader node determines whether the new event occurred within or near a geo-fence and/or within a time window of a current incident. At 415, the elected leader node associates the new event with the current incident and adjusts the geo-fence and/or the time window, if needed, to include the new event. At 420, the elected leader node creates a virtual incident (i.e., an incident that does not currently exist) with an appropriate geo-fence and time window and creates a token for the virtual incident. At 425, the elected leader node associates the new event with the virtual incident. At 430, the elected leader node determines that the resource type for the new event is an incident and allocates the token to a node based on a predefined incident allocation criterion.

Figure 5:
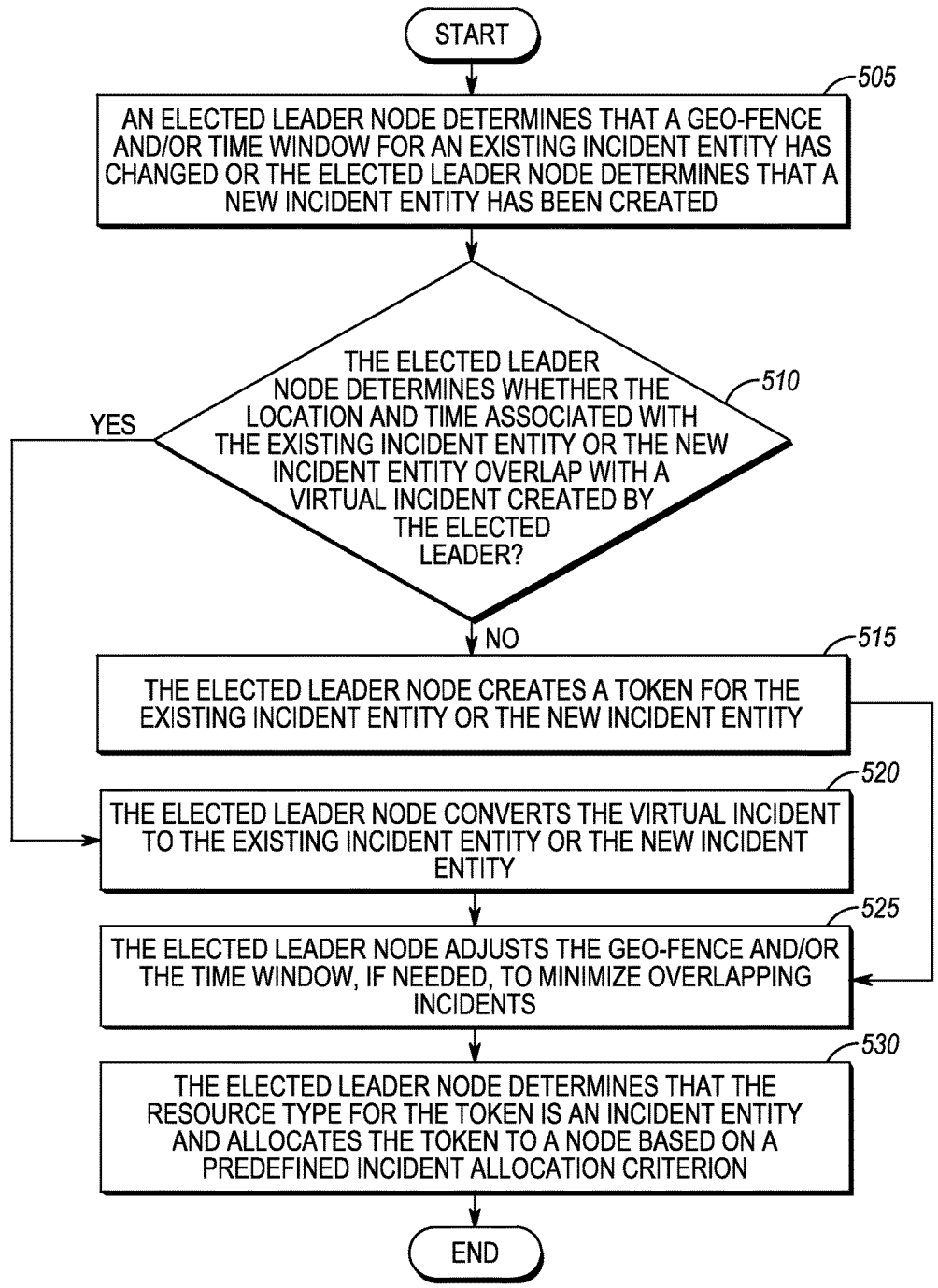
FIG. 5 illustrates a flow diagram of a method for assigning an incident entity token to an incident entity in accordance with some embodiments.

FIG. 5 illustrates a flow diagram of a method for assigning an incident entity token to an incident in accordance with some embodiments. At 505, an elected leader node determines that a geo-fence and/or time window for an existing incident entity has change or the elected leader node determines that a new incident entity has been created. At 510, the elected leader node determines whether the location and time associated with the existing incident entity or the new incident entity overlap with a virtual incident created by the elected leader. At 515, the elected leader node creates a token for the existing incident entity or the new incident entity. At 520, the elected leader node converts the virtual incident to the existing incident entity or the new incident entity. At 525, the elected leader node adjusts the geo-fence and/or the time window, if needed, to minimize overlapping incidents. At 530, the elected leader node determines that the resource type for the token is an incident entity and allocates the token to a node based on a predefined incident allocation criterion.

Figure 6:
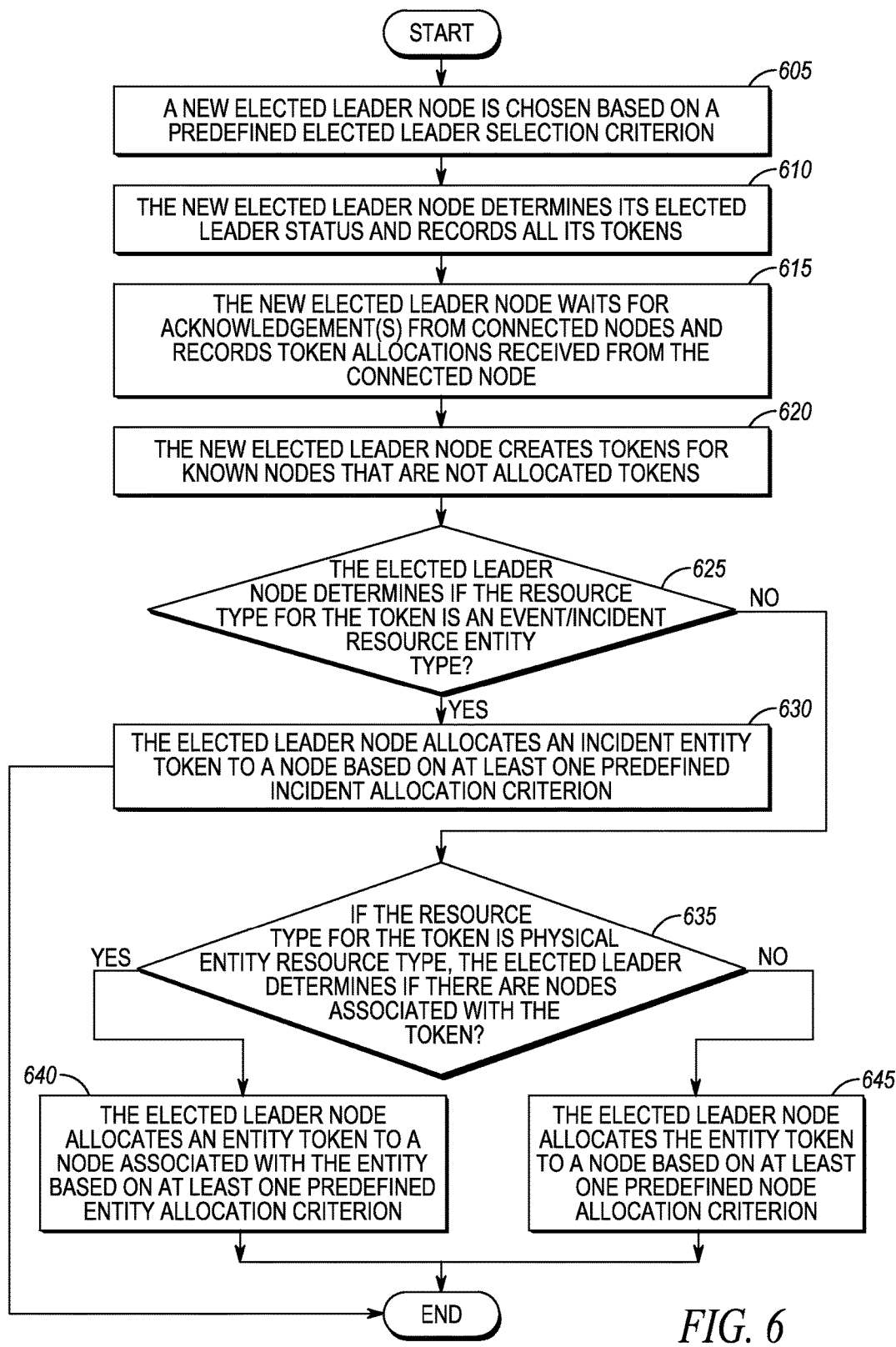
FIG. 6 illustrates a flow diagram of a method for determining a new elected leader node in accordance with some embodiments.

FIG. 6 illustrates a flow diagram of a method for determining a new elected leader node in accordance with some embodiments. At 605, a new elected leader node is chosen based on a predefined elected leader selection criterion. Non-limiting examples of the predefined elected leader selection criterion may include selecting the new elected leader node based on its broadcasting range, based on its proximity to an incident location, based on the number of nodes communicatively coupled to the new elected leader node, based on its proximity to or association with an incident commander, based on whether or not the new elected leader node is battery powered, and based on whether the new elected leader node is identified as an elected leader class node.

At 610, the new elected leader node determines its elected leader status and records all its tokens. At 615, the new elected leader node waits for acknowledgement(s) from connected nodes and records token allocations received from the connected node. At 620, the new elected leader node creates tokens for known nodes that are not allocated tokens. At 625, for each newly created token, the elected leader node determines if the resource type for the token is an incident resource type. At 630, if the resource type for the token is an incident resource type, the elected leader node allocates the token to a node based on at least one predefined incident allocation criterion. At 635, if the resource type for the token is not an incident resource type, the elected leader node determines if there are nodes associated with the token. At 640, the elected leader node allocates the token to a node associated with the entity based on at least one predefined asset allocation criterion. At 645, the elected leader node allocates the token to a node based on at least one predefined node allocation criterion.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for improved distributed rule ownership and avoiding a circular processing situation, the method comprising:
assigning, to a first mobile or portable electronic communication device in a group of mobile or portable electronic communication devices, a role of operating as server node for the group of mobile or portable electronic communication devices;
determining, by the first mobile or portable electronic communication device, that a sensor entity is associated with one of the first mobile or portable electronic communication device and a second mobile or portable electronic communication device different than the first mobile or portable electronic communication device in the group of mobile or portable electronic communication devices, the sensor entity being a sensor device capable of detecting one or more biological or environmental conditions;
creating, by the first mobile or portable electronic communication device, a sensor token and assigning the sensor token to the sensor entity;
assigning ownership, by the first mobile or portable electronic communication device, for the sensor token to the one of the first mobile or portable communication device and the second mobile or portable communication device based on one or more of:
at least one sensor entity allocation criterion;
at least one node allocation criterion; and
receiving, at each of the first mobile or portable electronic communication device and the second mobile or portable electronic communication device, sensor information associated with the sensor entity;
executing, by the one of the first mobile or portable communication device and the second mobile or portable communication device assigned ownership of the sensor token assigned to the sensor entity, and not the other of the first mobile or portable electronic communication device and the second mobile or portable electronic communication device, at least one predefined sensor entity rule on the sensor information associated with the sensor entity including transmitting an alert based on the sensor information to other electronic communication devices.

2. The method of claim 1, wherein the associating the sensor token with the sensor entity comprises determining that the sensor token is associated with the sensor entity and marking the sensor token for reassessment.

3. The method of claim 1, wherein when the sensor entity is disconnected from the one of the first mobile or portable electronic communication device and the second mobile or portable communication device and is associated with a third mobile or portable communication device, the sensor token associated with the sensor entity is marked for reallocation and ownership of the sensor token is assigned to the third mobile or portable communication device.

4. The method of claim 1, further comprising determining, by a third mobile or portable electronic communication device in the group of mobile or portable electronic communication devices, that the first mobile or portable electronic communication device is communicatively uncoupled from the group of mobile or portable electronic communication devices and operating, by the third mobile or portable electronic communication device, as the elected leader node for the group of mobile or portable electronic communication devices.

5. The method of claim 4, further comprising reporting, by each mobile or portable electronic communication device in the group of mobile or portable electronic communication device, sensor token assignments to the third mobile or portable electronic communication device;
deleting, by each mobile or portable electronic communication device assigned a sensor token in the group of mobile or portable electronic communication devices, sensor token assignments provided by the first mobile or portable electronic communication device;

discontinuing, by each mobile or portable electronic communication device in the group of mobile or portable electronic communication devices, execution of sensor entity rules associated with deleted sensor token assignments including transmitting of alerts to other electronic communication devices.

6. The method of claim 1, further comprising using the sensor token, by each mobile or portable electronic communication device assigned ownership of a sensor token in the group of mobile or portable electronic communication devices, to determine how sensor information associated with the sensor entity is to be shared with the group of mobile or portable electronic communication devices.

7. The method of claim 1, wherein assigning ownership comprises assigning ownership based on at least one sensor entity allocation criterion and wherein the sensor entity allocation criterion comprises at least one of assigning a sensor token to a mobile or portable electronic communication device in the group of mobile or portable electronic communication devices with the lowest number of assigned sensor tokens, assigning the sensor token to the most actively used mobile or portable electronic communication device in the group of mobile or portable electronic communication devices, and assigning the sensor token to a mobile or portable electronic communication device in the group of mobile or portable electronic communication devices that is not being battery powered.

8. The method of claim 1, wherein when the server node loses connection with the second mobile or portable electronic communication device, the server node deallocates sensor tokens assigned to the second mobile or portable electronic communication device.

9. The method of claim 1, wherein when the second mobile or portable electronic communication device loses connection with the server node, the second mobile or portable electronic communication device determines if it can reconnect with the server node within a hysteresis time, wherein if the second mobile or portable electronic communication device cannot reconnect with the server node within the hysteresis time, the second mobile or portable electronic communication device connects to a new elected leader node in the group of mobile or portable electronic communication devices.

10. The method of claim 1, wherein the sensor entity is one of a gunshot detector, an environment radiation sensor, an environmental toxicity sensor, a smoke detector, a carbon dioxide or carbon monoxide detector, a fire detector, a heart rate monitor, an oxygen level detector, a motion detector, and an accelerometer.

11. A system for improved distributed rule ownership and avoiding a circular processing situation, the system comprising:

a first mobile or portable electronic communication device and a second mobile or portable electronic communication device different from the first mobile or portable electronic communication device, where the first mobile or portable electronic communication device operates as an elected leader node device in a group of electronic communication devices including the second electronic computing device, wherein the elected leader node device is configured to:

determine that a sensor entity is associated with one of the first mobile or portable electronic communication device and a second mobile or portable electronic communication device in the group of mobile or portable electronic communication devices, the sensor entity being a sensor device capable of detecting one or more biological or environmental conditions;

create a sensor token and assign the sensor token to the sensor entity;

assign ownership for the sensor token to one of the first mobile or portable electronic communication device and the second mobile or portable electronic communication device based on one or more of:
at least one sensor entity allocation criterion;
at least one node allocation criterion; and wherein the first and second mobile or portable electronic computing devices are configured to:
receive, at each of the first mobile or portable electronic communication device and the second mobile or portable electronic communication device, sensor information associated with the sensor entity;

wherein one of the first mobile or portable electronic communication device and the second mobile or portable electronic communication device assigned ownership of the sensor token assigned to the sensor entity, and not the other of the first mobile or portable electronic communication device and the second mobile or portable electronic communication device, is configured to execute at least one predefined sensor entity rule on the sensor information associated with the sensor entity including transmitting an alert based on the sensor information to other electronic communication devices.

12. The system of claim 11, wherein subsequent to the first mobile or portable electronic communication device being communicatively uncoupled from the group of mobile or portable electronic communication devices, a third mobile or portable electronic communication device in the group becomes an elected leader node mobile or portable electronic communication device for the group of mobile or portable electronic communication devices.

13. The system of claim 12, wherein subsequent to the third mobile or portable electronic communication device becoming the elected leader node mobile or portable electronic communication device, each non-elected leader mobile or portable electronic communication device in the group of mobile or portable electronic communication devices:

reports sensor token assignments to the third mobile or portable electronic communication device;

deletes sensor token assignments provided by the first mobile or portable electronic communication device; and discontinues execution of sensor entity rules associated with deleted sensor token assignments.

14. The system of claim 11, wherein the sensor entity is one of a gunshot detector, an environment radiation sensor, an environmental toxicity sensor, a smoke detector, a carbon dioxide or carbon monoxide detector, a fire detector, a heart rate monitor, an oxygen level detector, a motion detector, and an accelerometer.

* * * * *